Figure 1:
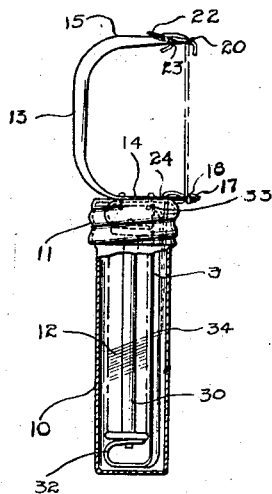

Nov. 16, 1926.　　　W. L. DEMING　　　1,607,061

DENTAL FLOSS HOLDER

Filed August 4, 1924

Inventor
William L. Deming
By Bates Macklin Goldrick & Pease
Attorney

Patented Nov. 16, 1926.

1,607,061

UNITED STATES PATENT OFFICE.

WILLIAM L. DEMING, OF SALEM, OHIO.

DENTAL FLOSS HOLDER.

Application filed August 4, 1924. Serial No. 729,901.

Dental floss, while effectively used by dentists for removing particles between teeth, has not been satisfactory when used by an individual with his own teeth on account of the inconvenience and disagreeableness of holding the inner end of the strand by the fingers in the mouth. Moreover, considerable deftness is required and the strand is frequently broken.

One of the objects of my invention is the provision of convenient means readily insertable in the mouth for holding taut a strand of dental floss in such manner, that it may be pressed between the teeth and effectively remove particles of food.

A further object is the provision of a combined container and strand holder so arranged that a spool or cop of floss may be maintained clean and antiseptic within the container, the end portion being drawn therefrom from time to time, and suitably held in position for use on the holding device.

The preferred means for carrying out my invention is illustrated in the drawings and is hereinafter fully set forth in the following description which pertains thereto. The essential characteristics, however, will be summarized in the claims.

Figure 2:
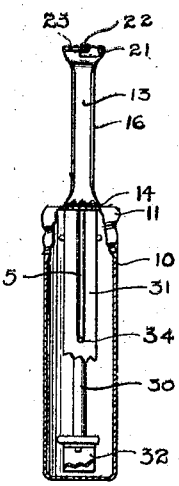
Figure 3:
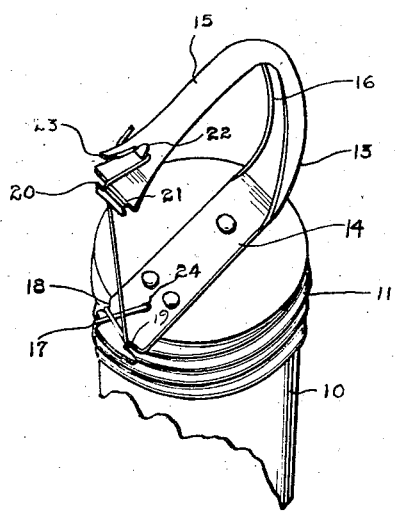

In the drawings, Fig. 1 is a side elevation of a container having dental floss therein and having a holder embodying my invention associated therewith; Fig. 2 is a side elevation of the holder and container shown in Fig. 1 and illustrating part of the container broken away; Fig. 3 is a perspective view showing the floss arranged on the holder and in position for use.

Referring to the drawings, I have illustrated my invention in connection with a transparent container 10 having a closure 11 at one end thereof, and in threaded engagement with the container. A roll of dental floss indicated at 12 is disposed within the container and is arranged to pass through an opening in the closure in the usual manner. My invention, in the preferred form, comprises a holder which is adapted to be permanently attached to the closure, wherefore the container cooperates with the holder to provide a handle for facilitating the use of the holder.

To this end, I have shown a holder 13 as comprising a bow-shaped member having one arm, as at 14, rigidly connected to the top of the closure, and having the opposite arm, as at 15, extending substantially parallel to and having substantially the same length as the first mentioned arm. The intermediate portion is preferably channel-shaped, as at 16, so as to provide a comparatively small member which is sufficiently rigid to prevent distortion thereof while in use.

To hold the floss securely within the holder during use, I have illustrated a simple expedient by which the floss can be readily locked without necessitating the tying of knots around the holder. I accomplish this by the use of notches in the member 13 and so arranging the notches as to require one layer of the floss to lie over an adjacent layer, and thereby to lock the floss upon itself at each end of the bow. For example, the arm 14 has notches 17, 18, and 19, while the arm 15 has notches 20, 21, 22 and 23.

With the arrangement of notches illustrated, the floss can be conveniently positioned in the following manner. A sufficient length to extend between the arms of the bow is drawn from the container through the opening 24, and is then passed downwardly in the notch 17, thence across the underside of the arm and in the notch 19, thence across the upper side of the arm and downwardly in the notch 18, thereby crossing the first layer of floss. The floss may then be carried up in the notch 19, thence across the bow into the notch 20 in the arm 15. The floss is then carried across the top of the arm 15 and passed downwardly in the notch 21, thence across the underside of the arm and again upwardly through the notch 20 thereby binding the floss upon itself. If desired the floss may be given another turn around the notch 21 to insure a more rigid connection. To retain the loose end of the floss I have shown the lip 22 as being formed by striking up a portion of the arm, while the notch 23 is formed by providing a slit along the side of the arm. Accordingly the end of the floss may be locked by passing it around the lip 22 and then through the slit 23.

It will be seen that the above-described arrangement effectively locks each end of the active stretch of floss. This stretch is therefore held taut and may be readily pressed into the restricted space between adjacent teeth and moved therein by using the container as a handle.

The invention above described is well adapted for combination with a container comprising a small bottle with a screw top, the bow 13 having its lower arm riveted or otherwise secured to the top. The bottle is of such size as to form a convenient handle for manipulation of the holder. This bottle may well be of such size as to loosely contain a spool or cop of floss of the usual size sold on the market and such floss may draw from the interior or exterior of the spool according to the winding thereof. I have illustrated means carried by the cap and adapted to project into the bottle for rotatably holding such spool. This device is comprised within my invention, but may be omitted if desired. It will now be described.

The means for holding the floss in the bottle, comprises a sheet metal bracket 31 which extends longitudinally of the container and has inwardly projecting portions 32 and 33 which are bent back on themselves to provide flexible supports in which a spool core 30 may journal. This core is shown as having projecting gudgeons mounted in holes in the end portions of the flexible lips. The upper arm of the bracket is rigidly secured to the under side of the bottle cap.

For this purpose, it is convenient to use the same rivets which secure the bow to the top of the cap. I prefer to provide an opening 34 near the center of the longitudinal portion of the bracket 31 through which the floss may be led so that it will pull approximately from the center of the spool. I have shown a guiding groove 35 in the bracket above this opening leading to the opening 24 through the cap and bow arm 14, enabling the floss to be led out near the free end of such arm.

In view of the foregoing description, it will be evident that my invention is well adapted for securely holding a short length of dental floss, so as to permit the use thereof without necessitating the insertion of fingers within the mouth to manipulate the inner end of the floss, and that the device is well adapted for use with such containers as those in which floss is ordinarily stored. Moreover, my invention provides a device which is simple and cheap to construct and may consist of stampings easily attached to the closure of the container.

I claim:

1. In a device of the character described, the combination with a container for dental floss, of a closure removably attached thereto, a U-shaped member having one arm thereof attached to the top of the closure and having each arm overhanging the edge of the closure, the arms having spaced notches on the overhanging portions for receiving and holding a strand of dental floss drawn from the container, and the free arm having a portion thereof struck upwardly considerably offset from the adjacent notches to provide a lip for locking the free end of said strip in an abrupt loop.

2. In a device of the character described, the combination with a container for dental floss, having a closure therefor, a U-shaped member attached to the under side of the closure and extending into the container, a winding spool journaled in said member and means outside the closure and carried thereby for holding taut a strand of dental floss drawn from the container.

3. In combination, a container for dental floss having an opening therein, a closure for said container, a bracket mounted on the under side of the closure having a pair of transversely extending U-shaped bearing portions formed thereon, a spool carried by said bearings, and a holder mounted on the closure outside the container for receiving a strand of floss drawn from the spool, and means for enabling the strand to be stretched between the holder and the closure, whereby the strand may be used for cleaning purposes while preventing unwinding the spool during use.

4. In a device of the character described, the combination with a container, of a removable closure therefor, a bracket in the container secured to the closure, said bracket extending inwardly and providing a yieldable support for both ends of a spool, a spool journaled in said bracket for carrying a roll of dental floss, a member mounted on the closure outside the container, said closure having an opening through which a strand of dental floss may be drawn from the spool, said member having provision for receiving and holding the floss.

5. In a device of the character described, the combination with a container having a closure therefor, of a spool within the container adapted to carry a roll of dental floss, a bracket having yieldable arms engaging the spool for rotatably supporting it within the container, one of said arms being rigidly secured to the inner side of the closure, a U-shaped member outside the container having one arm thereof rigidly attached to the top of the closure, the arms of said U-shaped member overhanging the edge of the closure and having spaced notches, whereby a strip of dental floss may be drawn from the roll and held stretched tightly between said arms.

6. The combination with a container having a screw cap, of a spool and holder therefor suspended from the under side of the cap and adapted to extend into the container and completely support the spool, and a dental floss holder secured to the outer side of the cap, whereby a strand of floss drawn from the spool may be held taut externally of the container.

7. In a device of the character described, the combination of a container adapted to be opened at the upper end, a cap for closing said opening, a spool holding device secured to the underside of the cap and adapted to be supported by it within the container or removed from the container as a unit with the cap, and U-shaped bow having one of its arms resting on and secured to the upper side of the cap and having provision for locking the external portion of a strand of dental floss drawn from the spool within the container, the cap having an opening for the passage of such strand.

In testimony whereof, I hereunto affix my signature.

WILLIAM L. DEMING.